(12) United States Patent
Squier

(10) Patent No.: US 9,555,893 B2
(45) Date of Patent: Jan. 31, 2017

(54) BLENDED FLOW AIR CYCLE SYSTEM FOR ENVIRONMENTAL CONTROL

(75) Inventor: Steven E. Squier, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1002 days.

(21) Appl. No.: 13/305,205

(22) Filed: Nov. 28, 2011

(65) Prior Publication Data
US 2013/0133348 A1 May 30, 2013

(51) Int. Cl.
| F28B 9/00 | (2006.01) |
| F25D 9/00 | (2006.01) |
| B64D 13/08 | (2006.01) |
| B64D 13/06 | (2006.01) |

(52) U.S. Cl.
CPC ....... B64D 13/08 (2013.01); *B64D 2013/0618* (2013.01); *Y02T 50/56* (2013.01)

(58) Field of Classification Search
CPC .. B64D 13/08; B64D 2013/0618; Y02T 50/56
USPC .................................................. 62/172, 402
See application file for complete search history.

(56) References Cited

U.S. PATENT DOCUMENTS

| 5,086,622 | A | * | 2/1992 | Warner | 62/88 |
| 5,442,905 | A | * | 8/1995 | Claeys et al. | 60/785 |
| 5,452,573 | A | * | 9/1995 | Glickstein et al. | 60/782 |
| 5,860,283 | A | * | 1/1999 | Coleman et al. | 62/87 |
| 6,182,435 | B1 | * | 2/2001 | Niggemann et al. | 60/772 |
| 6,427,471 | B1 | | 8/2002 | Ando et al. | |
| 6,519,969 | B2 | | 2/2003 | Sauterleute | |
| 6,684,660 | B1 | * | 2/2004 | Bruno | B64D 13/06 62/402 |
| 7,305,842 | B1 | * | 12/2007 | Schiff | 62/244 |
| 7,334,422 | B2 | * | 2/2008 | Zywiak et al. | 62/401 |
| 2004/0014419 | A1 | * | 1/2004 | Lents et al. | 454/237 |
| 2006/0162371 | A1 | * | 7/2006 | Lui et al. | 62/402 |
| 2007/0193301 | A1 | * | 8/2007 | Andres | 62/498 |
| 2007/0234731 | A1 | * | 10/2007 | Sheldon et al. | 60/772 |
| 2007/0266695 | A1 | * | 11/2007 | Lui et al. | 60/204 |
| 2007/0271952 | A1 | * | 11/2007 | Lui et al. | 62/402 |

* cited by examiner

*Primary Examiner* — Henry Crenshaw
(74) *Attorney, Agent, or Firm* — Cantor Colburn LLP

(57) ABSTRACT

An aircraft air provision system includes a power turbine that receives bleed air at a first pressure and provides rotational energy to a shaft and outputs output air at an intermediate pressure. The system also includes a compressor coupled to the shaft that receives input air at a second pressure that is lower than the first pressure and outputs compressed air having a pressure equal to the intermediate pressure and a mix chamber coupled to outputs of both the power turbine and the compressor where the output air and the compressed air are mixed. The system also includes a cooling turbine coupled to the shaft and that is in fluid communication with an output of the mix chamber.

3 Claims, 2 Drawing Sheets

BLENDED FLOW AIR CYCLE SYSTEM FOR ENVIRONMENTAL CONTROL

BACKGROUND OF THE INVENTION

The subject matter disclosed herein relates to environmental control systems and, in particular, to environmental control systems in an aircraft.

Aircraft have power systems that are comprised of several components, such as an engine, an environmental control system and a thermal management system. These systems are designed relatively independently from each other with power being transferred from one system to another.

The environmental control system (ECS) supplies pressurized air to the cabin and flight deck of an aircraft for both comfort and pressurization. The air is drawn from either or both the compressor stage of the engine (a bleed air system) or directly from exterior air (ram air system). In more detail, bleed air is extracted from the engine core at a pre-defined stage location in the engine compressor region. Frequently, this bleed air is delivered to the aircraft at temperature and pressure states well above what can be safely accommodated by the materials of systems used to distribute the air. Thus, a typical ECS includes preconditioning devices such as heat exchangers and pressure regulating valves to adjust the temperature and pressure of the bleed air to meet distribution system requirements. This pre-conditioning of the bleed air for the distribution system wastes the energy provided by the engine in compressing the air for extraction at the bleed port. This waste of energy is manifested in increased fuel burn required to maintain the desired thrust while also providing the bleed air stream for ECS requirements. A more efficient method of utilizing more of the existing bleed air energy would result in a more efficient aircraft. While improving the energy efficiency of aircraft power systems has been attempted by employing a "more-electric" approach to engine energy extraction, these methods also have their drawbacks in terms of additional weight, cost and complexity.

BRIEF DESCRIPTION OF THE INVENTION

According to one embodiment, an aircraft air provision system includes a power turbine that receives bleed air at a first pressure and provides rotational energy to a shaft and outputs output air at an intermediate pressure. The system also includes a compressor coupled to the shaft that receives input air at a second pressure that is lower than the first pressure and outputs compressed air having a pressure equal to the intermediate pressure and a mix chamber coupled to outputs of both the power turbine and the compressor where the output air and the compressed air are mixed. The system further includes a cooling turbine coupled to the shaft that is in fluid communication with an output of the mix chamber.

According to another embodiment, a method of providing air to cabin of an aircraft is disclosed. The method includes: providing bleed air to a power turbine at a first pressure to produce rotational energy on a shaft and produce output air at an intermediate pressure; compressing air at a second pressure, in a compressor coupled to the shaft, into compressed air having a pressure equal to the intermediate pressure, wherein the second pressure is less than the first pressure; providing the output air and the compressed air having a pressure at the intermediate pressure to a mix chamber coupled to outputs of both the power turbine and the compressor; mixing the compressed air and the output air in the mix chamber to form mixed air; and providing the mixed air to a cooling turbine coupled to the shaft.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments of the present invention that are described in greater detail below may improve the efficiency of engine bleed air extraction by utilizing more of the bleed air energy contained in the bleed air stream coming out of a compressor section of a turbine engine than in conventional systems. Typically, all of the cabin/flight deck air is provided by the engine bleed system. In embodiments disclosed herein, only a portion of the required cabin air is provided through this method. The remaining portion of the cabin/flight deck air is provided by either ram air extraction at prevailing static conditions of the atmosphere, or from lower pressure fan air extraction, depending upon which embodiment of the invention is employed. However, two air streams at different pressures cannot be mixed without some pressure reduction in the higher energy stream (bleed air) or pressure increase in the lower energy stream (ram air). In embodiments disclosed herein, excess pressure in the bleed air is used to drive a turbocompressor that pressurizes the air delivered from the ram air. Through a control scheme that adjusts the flowrate from each air source, the result is a set of two air streams at identical pressures that may be easily combined, even though they will likely be at different temperatures. Advantageously, existing excess pressure energy in the bleed air is used as opposed to being lost in a conventional system that throttles down the pressure to meet distribution system requirements.

Figure 1:
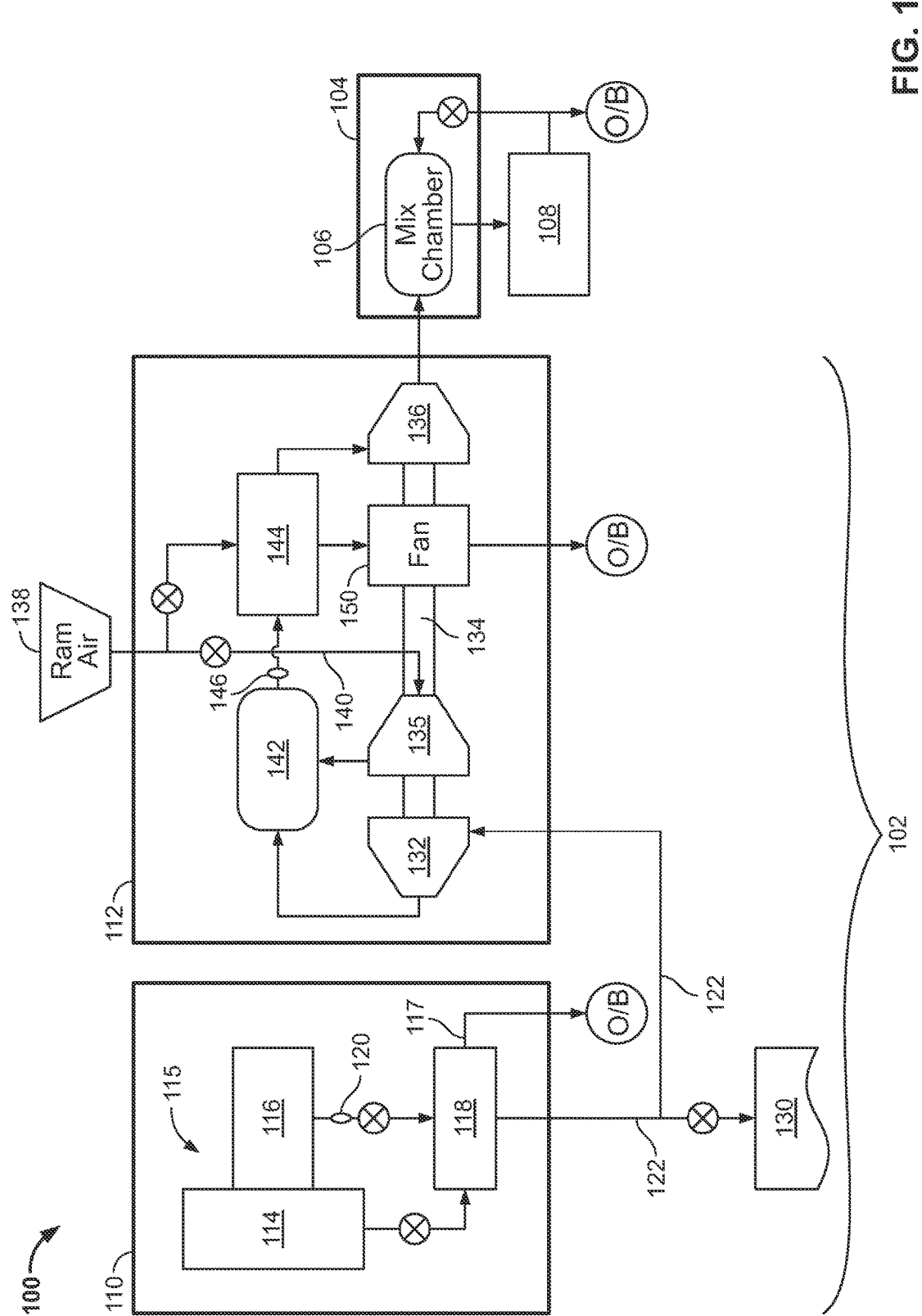
FIG. 1 is a block diagram illustrating a system that includes an ECS and components that can be used to supply air to the ECS according to one embodiment.

FIG. 1 illustrates a system 100 that includes an air providing system 102 coupled to a cabin air recirculation system In one embodiment, the system 100 is part of an aircraft and receives input air from outside of the aircraft and provides it to the cabin air recirculation system 104 at a predetermined temperature and a predetermined pressure. The predetermined temperature and pressure can be varied in time and, as such, may respectively be referred to herein as temperature and pressure setpoints or collectively as "setpoints."

In one embodiment, the cabin air recirculation system 104 is formed as is known in the art. In the illustrated embodiment, the cabin air recirculation system 104 includes a mixing chamber 106 that mixes air received from the air providing system 102 with air re-circulated from the passenger cabin or flight deck 108 of an aircraft before it is provided to the passenger cabin or flight deck 108. The particulars of the cabin air recirculation system 104 are known in the art and, as such, will not be discussed further herein.

The illustrated air providing system 102 includes a bleed air supply 110. The bleed air supply 110 provides bleed air to other parts of the air providing system 102. In one embodiment, the bleed air supply 110 includes an engine 115 that includes at least a fan 114 and a compressor section 116. Both the fan 114 and the compressor 116 are coupled to a precooling heat exchanger 118. The precooling heat exchanger 118 utilizes air from the fan 114 to cool air from compressor 116. The air from the fan 114 can be dumped overboard after it cools the air from the compressor 116 as indicated by arrow 117. In particular, the air that exits the compressor 116 at node 120 and that is coupled to the precooling heat exchanger 118, can be in the range of 900 degrees F. (482 degrees C.) and at a high pressure. This air is too hot for it to be transferred by ducting or other connecting elements of the system 100 that can be formed of aluminum, for example. Thus, the air is, in one embodiment, reduced to about 400 degrees F. (204 degrees C.) by the precooling heat exchanger 118 before being output via connection 122. The air remains at a high pressure at this point. In one embodiment, the "high pressure" is in the range of 40 psig. In one embodiment, some of the cooled air in connection 122 can be provided to other systems 130. The other systems 130 can include, for example, a deicing or anti-icing system 130.

The air providing system 102 also includes an air pressure/temperature conditioning system 112. The air pressure/temperature conditioning system 112 (or conditioner) receives bleed air from the bleed air supply 110 and provides it to the cabin air recirculation system 104 at the setpoints. In the illustrated embodiment, lower temperature (relative to the temperature of air that comes out of the compressor 116), high pressure air is provided to a power turbine 132 of the conditioner 112. According to one embodiment, the power turbine 132 is coupled to a shaft 134 that drives a compressor 135. It shall be understood that shaft 134 could be driven by (e.g., cooling turbine 136) or drive other elements and may be segmented or unitary.

Some or all of the bleed air is provided to the power turbine 132 via connection 122. As discussed above, the air is at a high pressure. In one embodiment, the air in connection 122 is going to be mixed with ram air that is at a much lower pressure. As such, the air provided to power turbine 132 is allowed to expand to reduce its pressure to an intermediate value. The term "intermediate" as used herein with respect to pressure refers to a pressure that is lower than the pressure of bleed air that leaves the precooling heat exchanger 118 and greater than the pressure setpoint. The expansion of the high pressure air causes the air to slightly cool and provides rotational power to shaft 134 and, as such, can be used to drive compressor 135. The intermediate pressure air leaves the power turbine 132 and is provides to a mix chamber 142.

Compressor 135 receives ram air from a ram air scoop 138 via connection 140. The compressor 135 compresses this air to the same intermediate pressure as that output by power turbine 132. The output of the compressor 135 is also provided to the mix chamber 142. As such, the cooler ram air and hotter bleed air are provided to the mix chamber at the same pressure (e.g., at the intermediate pressure). The amount that air is cooled in the mix chamber is based on the mass flow rates through power turbine 132 and compressor 135 as will be understood by the skilled artisan based on the teachings herein.

The mixed air that exits the mix chamber 142 indicated at node 146 is now at a lower temperature than the temperature of the air that exited the power turbine 132. In one embodiment, this air could be at or about a desired to temperature for provision to cabin air recirculation system 104 or to cooling turbine 136. However, in some cases it may be desirable to further lower the temperature. In such a case, air that exits the mix chamber 142 can be provided to an optional secondary heat exchanger 144 to lower the temperature to a desired level. In one embodiment, the secondary heat exchanger 144 is coupled to a ram fan 150 that draws cooling air from ram scoop 138 through the secondary heat exchanger 144. The amount of ram air required in the secondary heat exchanger 144 is related to the amount of fan air used in the precooling heat exchanger 118 in one embodiment.

The air that exits the mix chamber 142 (whether cooled in secondary heat exchanger 144 or not) is provided to cooling turbine 136. The cooling turbine 136 is coupled to shaft 134 so the combined work generated by both the power turbine 132 and the cooling turbine 136 matches the work required by the compressor 135 and the ram fan 150 (if needed), with the exception of some lost work due to windage and bearing friction. In one embodiment, all components directly coupled to the shaft 134 rotate at the same speed. The exit stream of the cooling turbine 136 is at temperature and pressure set points and, as such, can be provided to the cabin air recirculation system 104.

As described above, excess pressure in the bleed stream is extracted by power turbine 132 and used to drive a compressor 135 to pressurize the ram air from ram scoop 138. By adjusting the flowrate from each air source, the result is a set of two air streams at identical pressures that may be easily combined, even though they will likely be at different temperatures. In contrast to the prior art where excess pressure in the bleed stream is throttled and lost, existing excess pressure energy in the bleed stream is used. Indeed, thermodynamic analysis of the embodiment of FIG. 1 (as well as that of FIG. 2) indicates that both bleed and ram air requirements may be reduced as compared to conventional systems. Reduction in the amount of bleed air can lead to a reduction in fuel required by engine 115.

Figure 2:
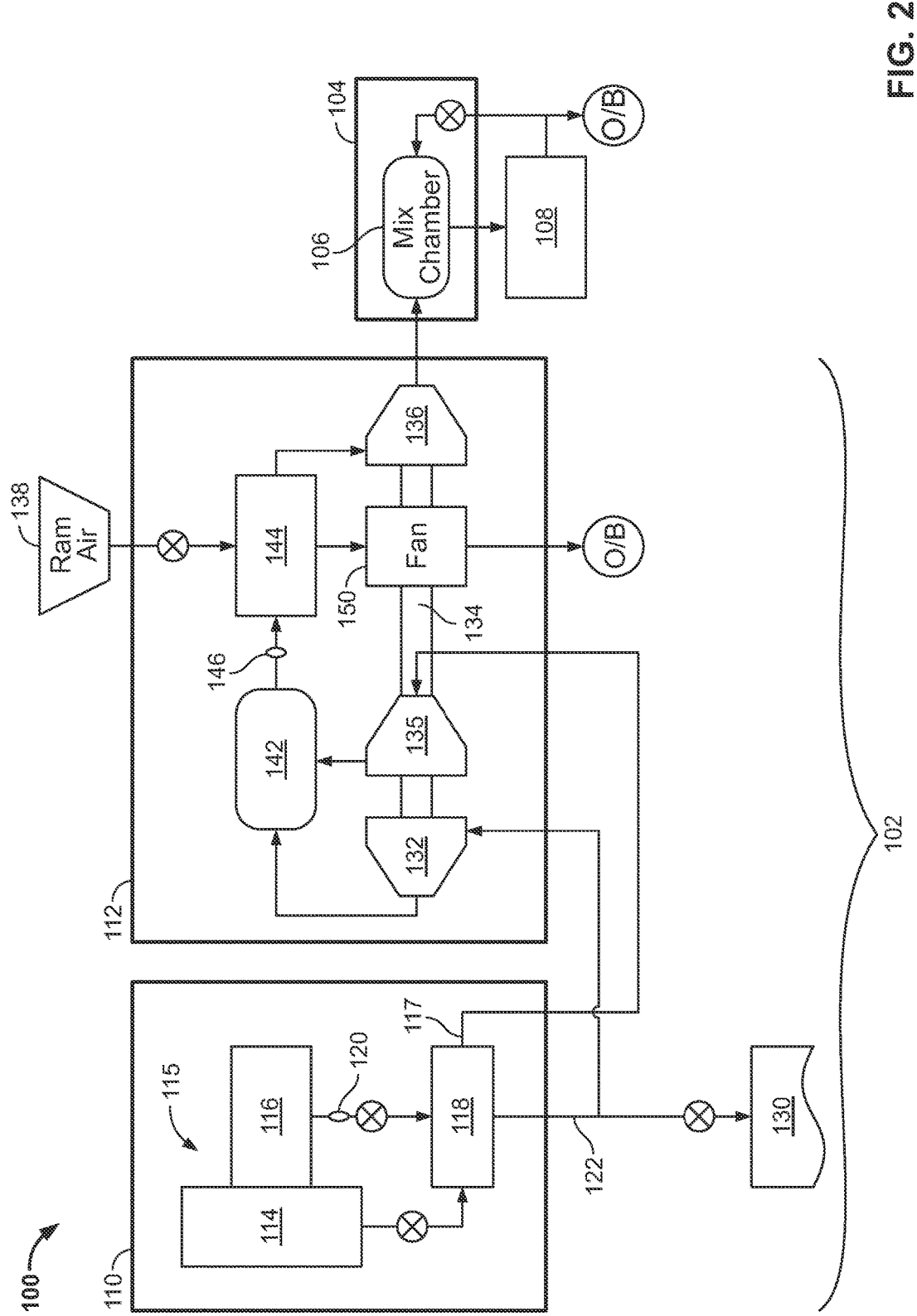
FIG. 2 is a block diagram illustrating a system that includes an ECS and components that can be used to supply air to the ECS according to another embodiment.

FIG. 2 illustrates an alternative embodiment of the present invention. In this embodiment, the input to compressor 135 is provided from the output of precooling heat exchanger 118 rather than from the ram air scoop 138 as in FIG. 1. As such, the combined flowrates of air from compressor 116 and fan 114 are controlled to equal the desired cabin fresh air flowrate. In this embodiment, ram air from ram scoop 138 is used simply to precondition the blended flow stream at secondary heat exchanger 144 prior to entering the cooling turbine 136 to ensure that air exiting cooling turbine 136 meets the setpoints.

It shall be understood that, based on correct balancing of flow rates from the fan 114 and compressor 116, precooling heat exchanger 118 may be omitted in the embodiment illustrated in FIG. 2.

In each of the embodiments described above, it shall be understood that one or all of the power turbine 134, compressor 135, fan 150 and cooling turbine 136 can be coupled to a single shaft 134.

In view of the above disclosure, it will be realized that one or more of the advantages described over the prior art described below may be realized. The advantages may include: improved utilization of high energy engine bleed air streams resulting in better fuel economy across the aircraft mission spectrum; reduced component size, particularly for the precooler and secondary heat exchangers due to better temperature management; elimination of engine bleed pressure regulation and simplification of the engine bleed shut off valve; and provision for appropriately conditioned anti-icing (or de-icing) air to satisfy existing systems.

In each of the embodiments described above, the intermediate pressure of the blended flow stream is allowed to "float" to minimize the high-energy bleed air extraction flowrate, without compromising the material limitations of the air distribution system. One of ordinary skill will realize that in one embodiment, a control system can be utilized to determine the optimum intermediate pressure, air stream flowrates, and shaft 134 speed to maximize vehicle energy efficiency.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft air provision system comprising:
a power turbine that receives bleed air, the power turbine providing rotational energy to a shaft and outputs output air at an intermediate pressure, the bleed air received from a first source consisting of a compressor section of an engine;
a compressor coupled to the shaft that receives input air from the compressor section of the engine, the compressor outputting compressed air having a pressure equal to the intermediate pressure;
a mix chamber coupled to outputs of both the power turbine and the compressor where the output air and the compressed air are mixed;
a second heat exchanger in fluid communication with an output of the mix chamber, the second heat exchanger receiving ram air from a ram air scoop for mixing with the output of the mix chamber;
a second fan coupled to the shaft, wherein the second fan draws air through the second heat exchanger;
a cooling turbine coupled to the shaft and that is in fluid communication with an output of the second heat exchanger; and
a precooling heat exchanger in fluid communication with an input of the power turbine and configured to cool air exiting the compressor section, wherein the precooling heat exchanger utilizes air from a first fan of the engine to cool air exiting the compressor section, wherein the bleed air is received from an output of the precooling heat exchanger.

2. The system of claim 1, wherein the input air is received from a ram air scoop.

3. The system of claim 1, further comprising:
a cabin air recirculation system coupled to an output of the cooling turbine.

* * * * *